US008484859B2

(12) United States Patent
Dhese et al.

(10) Patent No.: US 8,484,859 B2
(45) Date of Patent: Jul. 16, 2013

(54) PARALLELLISM CONSERVATION MECHANISM FOR NANOPOSITIONER

(75) Inventors: Keith Dhese, Cambridge (GB); Alin Ristea, Ely (GB)

(73) Assignee: Thorlabs, Inc., Newton, NJ (US)

( * ) Notice: Subject to any disclaimer, the term of this patent is extended or adjusted under 35 U.S.C. 154(b) by 39 days.

(21) Appl. No.: 13/278,497

(22) Filed: Oct. 21, 2011

(65) Prior Publication Data
US 2012/0096974 A1    Apr. 26, 2012

Related U.S. Application Data

(60) Provisional application No. 61/405,391, filed on Oct. 21, 2010.

(51) Int. Cl.
*B23Q 3/18* (2006.01)
*B23Q 3/00* (2006.01)
*H01L 21/68* (2006.01)
*G01B 5/00* (2006.01)

(52) U.S. Cl.
USPC ............................................. 33/568; 33/573

(58) Field of Classification Search
USPC .................................... 33/568, 573
See application file for complete search history.

(56) References Cited

U.S. PATENT DOCUMENTS

| 3,058,226 | A | * | 10/1962 | Michael | 33/568 |
| 4,559,717 | A | * | 12/1985 | Scire et al. | 33/568 |
| 4,667,415 | A | * | 5/1987 | Barsky | 33/568 |
| 4,688,908 | A | | 8/1987 | Moore | |
| 4,691,586 | A | * | 9/1987 | van Leijenhorst et al. | 74/490.09 |
| 4,887,804 | A | * | 12/1989 | Ohtsuka | 269/73 |
| 4,888,878 | A | * | 12/1989 | Nagasawa et al. | 33/573 |
| 5,400,523 | A | * | 3/1995 | Hatheway | 33/828 |
| 5,764,498 | A | * | 6/1998 | Sundstrom | 361/809 |
| 6,137,627 | A | | 10/2000 | Engelhardt et al. | |
| 6,246,052 | B1 | * | 6/2001 | Cleveland et al. | 250/234 |
| 6,453,566 | B1 | * | 9/2002 | Bottinelli et al. | 33/1 M |
| 6,467,761 | B1 | * | 10/2002 | Amatucci et al. | 269/58 |
| 7,240,434 | B2 | * | 7/2007 | Lee et al. | 33/1 M |

FOREIGN PATENT DOCUMENTS

| WO | 2007-032026 | 3/2007 |
| WO | 2008-015701 | 2/2008 |

OTHER PUBLICATIONS

International Search Report and Written Opinion of the ISA for corresponding International Application No. PCT/US2011/057243 with mail date of Jun. 26, 2012.

* cited by examiner

*Primary Examiner* — Christopher Fulton
(74) *Attorney, Agent, or Firm* — Graham Curtin, P.A.

(57) ABSTRACT

A mechanical device for maintaining parallelism includes first, second, third and fourth bars. The first side surface of the first bar and the first side surface of the second bar are bridged by a first flexure, leaving a gap between the bottom surface of the first bar and the upper surface of the second bar; the second side surface of the second bar and the second side surface of the third bar are bridged by a second flexure, leaving a gap between the bottom surface of the second bar and the upper surface of the third bar; and the first side surface of the third bar and the first side surface of the fourth bar are bridged by a third flexure, leaving a gap between the bottom surface of the third bar and the upper surface of the fourth bar.

15 Claims, 8 Drawing Sheets

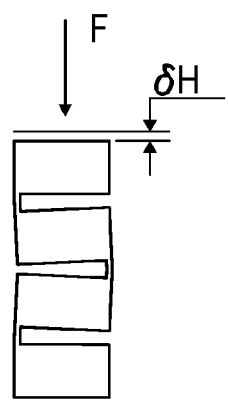 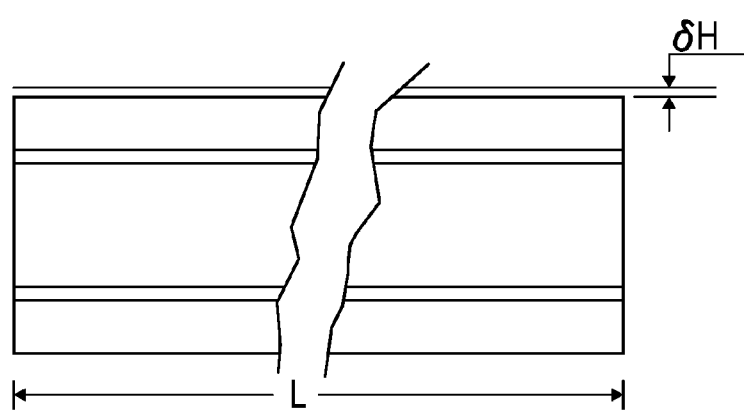
FIG. 2A    FIG. 2B
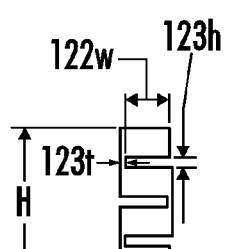 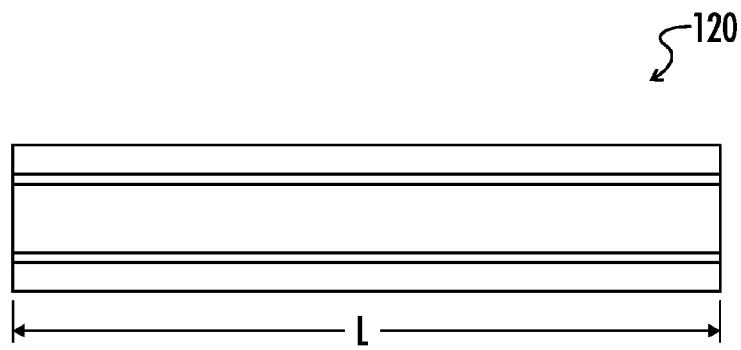
FIG. 3A    FIG. 3B

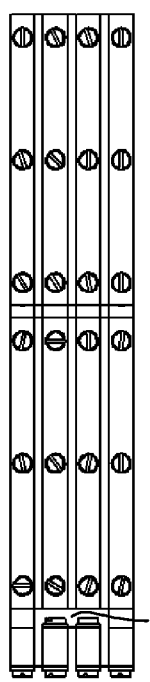 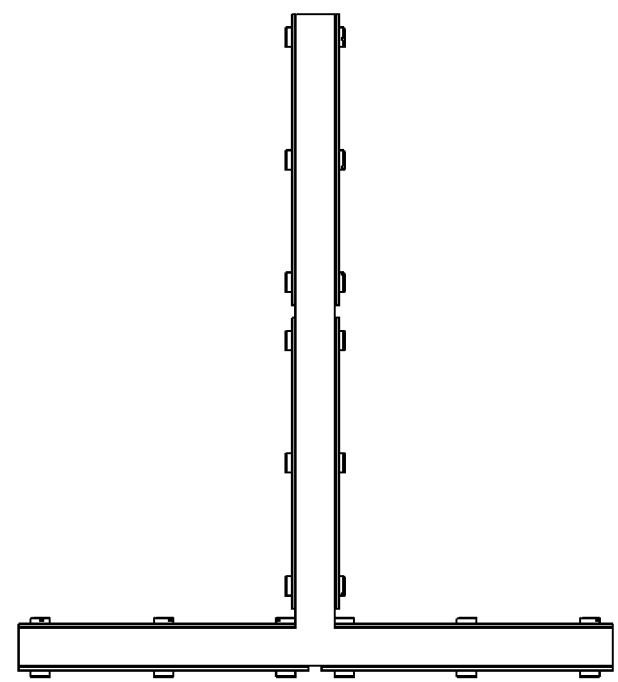 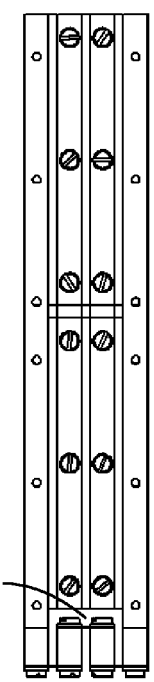
*FIG. 9B*  *FIG. 9C*  *FIG. 9D*

PARALLELLISM CONSERVATION MECHANISM FOR NANOPOSITIONER

CROSS-REFERENCE TO RELATED APPLICATIONS

This application claims the benefit of U.S. Application Ser. No. 61/405,391, filed Oct. 21, 2010, the contents of which are incorporated by reference herein.

FIELD OF THE INVENTION

This invention relates to, in one embodiment, an intrinsic mechanical mechanism for maintaining parallelism between upper and lower surfaces of a translating device such as a nano-positioning stage. A key aspect is that parallelism is maintained between a moving and fixed world even with the application of asymmetric actuation. Such an intrinsic parallel maintaining mechanism eliminates the need for complex multiple actuation and position feedback elements.

BACKGROUND

A nanopositioning mechanism or stage is a device that requires a high positioning accuracy and repeatability in the nanometric regime. It also typically deploys a feedback sensor and an actuator with similar nanometric resolution in order to be used in an automatic or programmable mode to determine position precisely. The actuator and feedback sensor are often closed using a control loop in order to maintain a precise position by compensating for mechanical drift and other phenomena that affect position stability. If the sample or device being positioned covers a macroscopic length or area (macroscopic compared to the travel range in the axis of motion perpendicular to the sample or device), it is also often a requirement that it be held microscopically parallel to the fixed world reference plane as it is translated in the axis of travel. The purpose of the described invention is to ensure via an intrinsic mechanical means that a moving large area platform (e.g. that holds the sample or device) is maintained microscopically parallel. This is one embodiment of a wider variety of uses of the invention described.

For this purpose, at a conceptual level, two planes are necessary: a reference fixed plane and a moving plane. The moving plane is required to be parallel with the reference as it translates. Traditional solutions for achieving this deploy more than one actuator placed between the reference and the moving plane. Each actuator has its own sensor for detecting the stroke. By having multiple pairs of actuators and sensors, the parallelism can be maintained using a multi channel control system often with closed loop control on each actuator/sensor combination. However it would be preferable from a cost and control complexity perspective if for these systems only one actuator with one sensor is required with the parallelism maintained in an intrinsic manner.

SUMMARY

This is possible by replacing the additional pairs of actuators and position sensors with parallel conservation mechanisms (PCM), the subject of one embodiment of the invention described herein. The PCM's 120 are placed between the reference base plate 130 (plane) and a top plate 110 (plane), like the examples 100a and 100b shown in FIG. 6 or FIG. 7. Any tilt angle or possible lack of parallelism between the base plate 130 and top plate 110 will be compensated by the PCM's 120 mounted between these plates. The structure 100b shown in FIG. 7 comprising of four PCM's 120 and upper/lower plates 110, 130 has no lateral travel whatsoever, the only degree of freedom being confined to one axis of translation (Z axis). This concept is particularly applicable to Z axis microscopy stages, where achieving highly accurate travel on the Z axis, with a high precision parallelism between the base plate and the moving plate, without any parasitic lateral movement is critical to operation. A microscopy Z stage is just one example, as the PCM and structures comprising of PCM's in any combination can be used in any application where the above mentioned parallelism is necessary.

The parallelism conservation mechanism (PCM) of the present disclosure reduces the number of actuators/sensors needed. Theoretically, by configuring a system with a certain number of PCM's, just one actuator and one positioning sensor is needed to achieve a system that will have parallelism between the reference and moving plane. The sensor used can be capacitive, strain gage or any other type of sensor that can detect movement in the nanometric regime. The actuators can be preferably piezoelectric type, but any other type of actuator that can provide motion in the same resolution regime as the sensor can be used.

Using PCM's for such a system will also give the option of adjusting the system stiffness, thus shifting the natural frequencies without modifying the design of the actuators. Adding more PCM's or increasing the stiffness of the ones already used will shift up the natural frequency of the combined assembly.

In one embodiment shown in FIG. 1, a mechanical device 120 for maintaining parallelism is provided. The mechanical device 120 preferably includes: a first bar 122, a second bar 124, a third bar 126 and a fourth bar 128, each bar having an upper surface, a bottom surface, a first side surface and a second side surface, the upper surface of the first bar 122 forming the upper surface of the device 120 and the bottom surface of the fourth bar 128 forming the bottom surface of the device; wherein the first side surface of the first bar and the first side surface of the second bar are bridged by a first flexure 123, leaving a gap between the bottom surface of the first bar 122 and the upper surface of the second bar 124; the second side surface of the second bar 124 and the second side surface of the third bar 126 are bridged by a second flexure 125, leaving a gap between the bottom surface of the second bar 124 and the upper surface of the third bar 126; and the first side surface of the third bar 126 and the first side surface of the fourth bar 128 are bridged by a third flexure 127, leaving a gap between the bottom surface of the third bar 126 and the upper surface of the fourth bar 128.

The mechanism is capable of maintaining the parallelism between different points, over its own entire length, regardless of the point that is directly the subject of a pushing force. A simple representation of a mechanism 120 can be seen in FIG. 1. This particular representation shows a monolithic type structure 120, but the mechanism can be made from different components and in different sizes, depending on the requirements of the application. The mechanism can be manufactured from any material or composite material, as long as the one selected can fulfill the demands of the application where used.

BRIEF DESCRIPTION OF THE DRAWINGS

FIG. 2A shows one embodiment of a frontal (cross section as well) and FIG. 2B shows one embodiment of a lateral view of the PCM, and the way it deflects when a pushing force F is applied.

FIG. 3A shows one embodiment of a front view and FIG. 3B shows one embodiment of a lateral view showing the characteristic dimensions of the PCM.

FIGS. 9B-9D show orthographic views of an example of a T-shape design according to an embodiment of the invention.

DETAILED DESCRIPTION OF THE PREFERRED EMBODIMENTS

Figure 1:
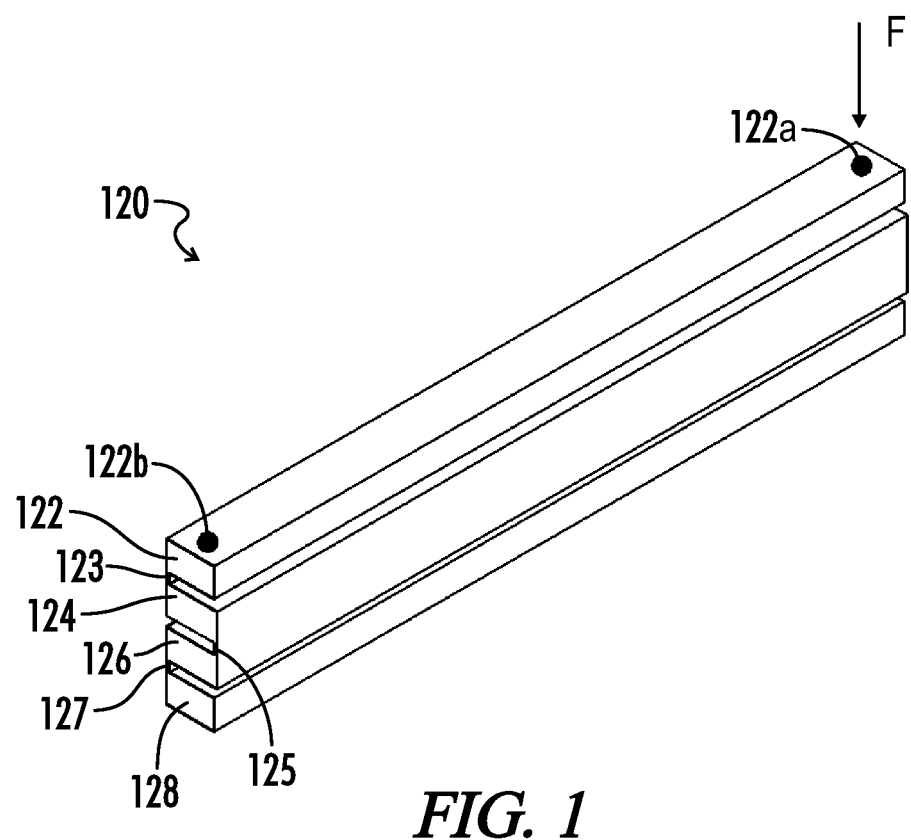
FIG. 1 is a perspective view of one embodiment of a PCM.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 4A:
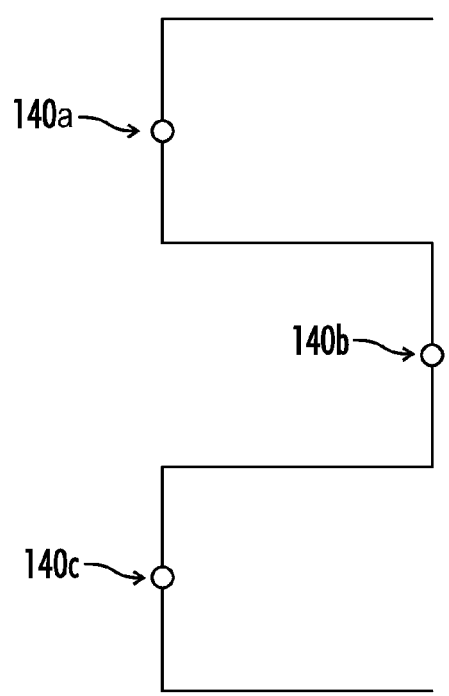
FIGS. 4A and 4B represent one embodiment of an equivalent kinematic representation of the PCM cross section.
Figure 4B:
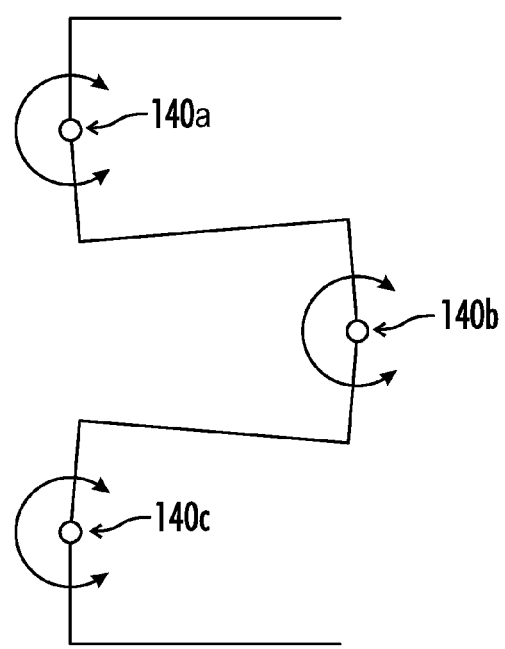

The PCM mechanism shown in the figures represents a flexure type mechanism that can be used in a nanopositioning stage, for example, or in any other application that will require a uniform deflection along the entire length of the flexure mechanism. One feature and benefit of the PCM is maintaining the same deflection value for both points 122a and 122b as shown in FIG. 1 if pushed with a force F on just one of the two mentioned points. Likewise the same deflection value at both points 122a and 122b is equally maintained if the pushing force is replaced by a pulling force. This is achieved via three rotational joints 140a, 140b, and 140c as shown by the equivalent kinematic configuration of FIGS. 4A and 4B. These rotational joints 140a, 140b, and 140c are represented in one embodiment by the flexures seen in the cross section view of the PCM design (FIG. 2A). The flexure type design will ensure that when a force F is applied, these three flexures 140a, 140b, and 140c will behave like rotational joints. Given the thin section of the flexure material across the length L (FIG. 3B) the uniform deflection will be achieved across the same length.

If one actuator and PCM pair is used, over the length L (see FIG. 2B or 3B), parallelism is met over the full stroke, eliminating the need to deploy more than one actuator and feedback sensor in order to control parallelism. Another advantage of a PCM is that it comprises a stiff system across its entire length, this way keeping the natural frequencies at higher values. All the above advantages have been described for one PCM. A number of PCM's can be used to constrain the mechanical motion of one moving plate parallel with respect to another plate (see, for example, the embodiments of FIGS. 6, 7 and 8).

These can be configured depending on the particularities of the application where used, and the configuration can have any shape and size in terms of the number of the PCM's used, their stiffness and mass. Stiffness and mass are important given the natural frequencies that will result from their ratio. The actuator used in systems that use PCM's can preferably be piezoelectric for nanometric precision, but also any other type of actuators can be used in order to achieve the desired motion.

Figure 5:
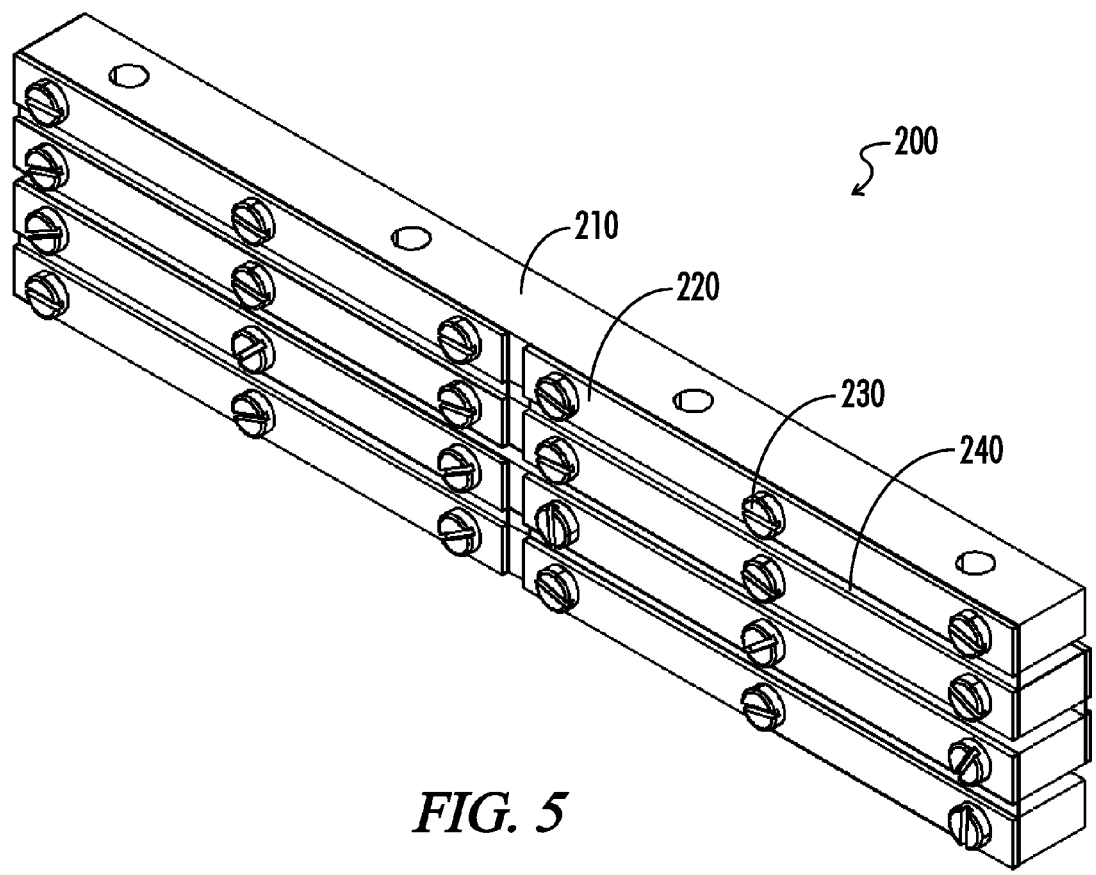
FIG. 5 shows one embodiment of a constructive example of a PCM as an assembly, with stainless steel flexures.

In terms of manufacturing, the PCM can be fabricated by processes like wire erosion, molding or any other suitable manufacturing process if the aim is to have a monolithic structure (see FIG. 1). Otherwise, it can be constructed as an assembly, as in FIG. 5 by using flexures 240, flexure retaining strips 220 to achieve a uniform distribution of the compression force from screws 230 and also the main structural elements 210 that will connect to the flexures 240.

The mass and stiffness of the PCM 120 can be varied by changing the geometric parameters 122w, 122h and 123t from FIG. 3A. Decreasing the width 122w will decrease the mass and increase the stiffness (reaction force) of the PCM assembly 120 due to the higher stress and strain experienced by the flexure joints. As the width 122w goes lower, for the same achieved deflection the moment arm given by the same pushing force F will be higher, thus the reaction force of the PCM for the same achieved deflection will be higher. Increasing the thickness 123t will increase the stiffness of the PCM, but with additional mass added. Increasing the height 122h will decrease the PCM stiffness, given the smaller reaction forces. All these parameters can be varied to achieve the desired mass and stiffness and hence natural frequency for a particular system design.

Figure 6:
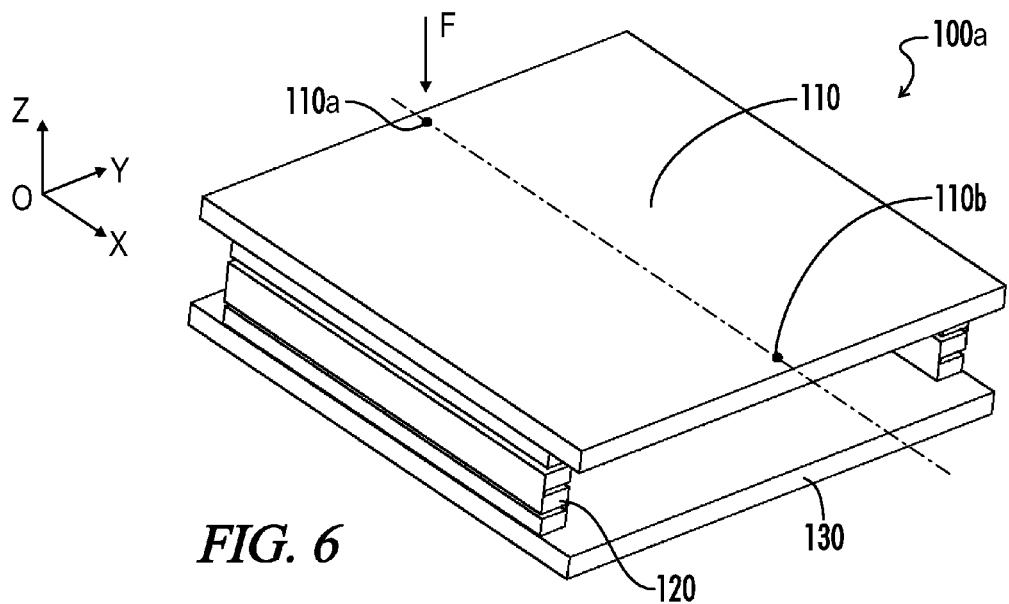
FIG. 6 shows one embodiment of an example of two plates being kept parallel with two PCM's.
Figure 7:
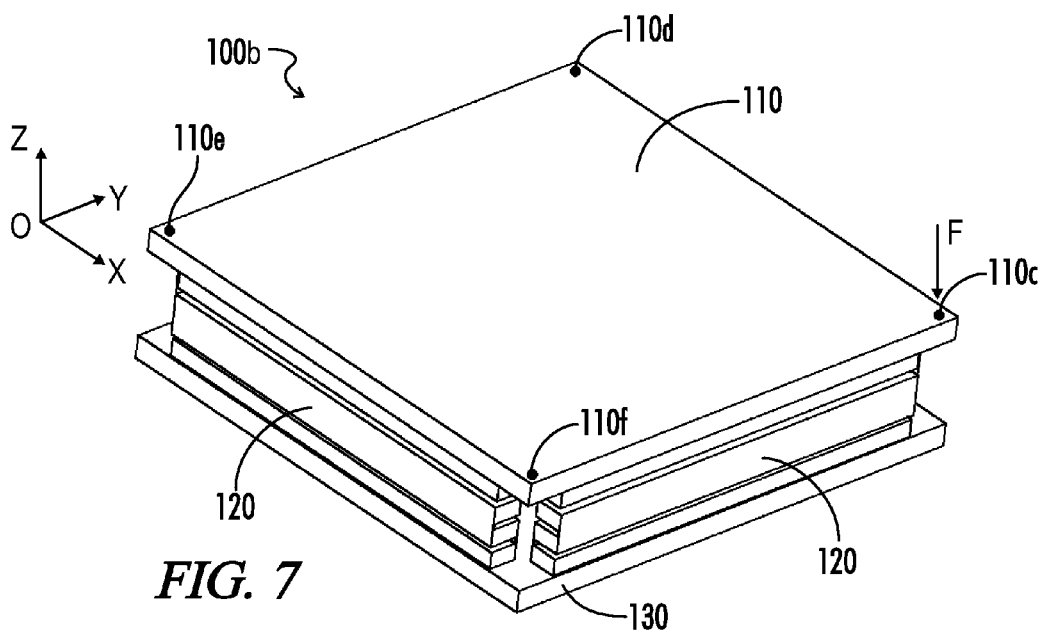
FIG. 7 shows an example of one embodiment of two plates being kept parallel with four PCM's.
Figure 8:
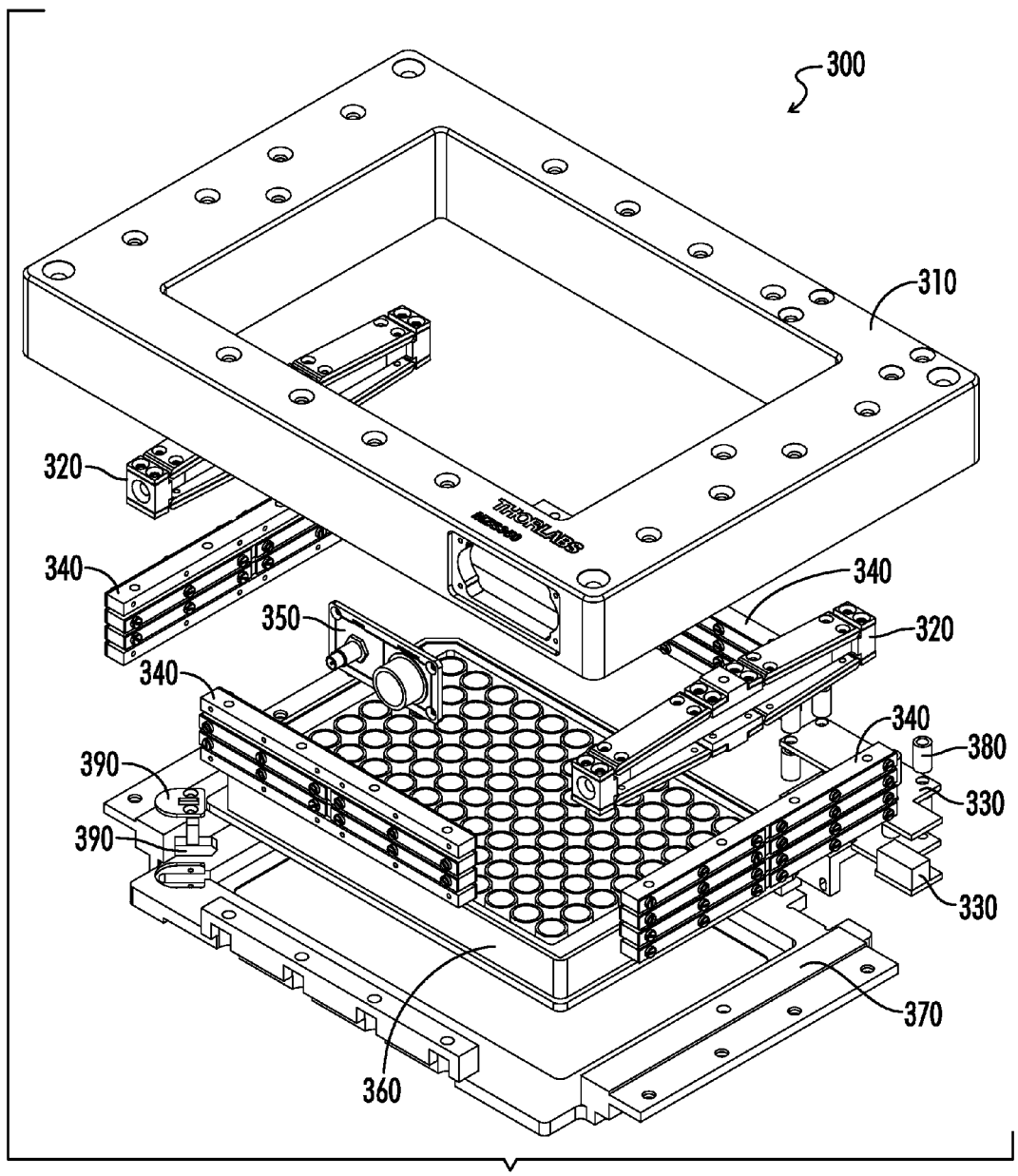
FIG. 8 shows an exploded view of a piezo actuated Z flexure microscopy stage illustrating one specific embodiment of two plates being kept parallel with four PCM's.
Figure 9A:
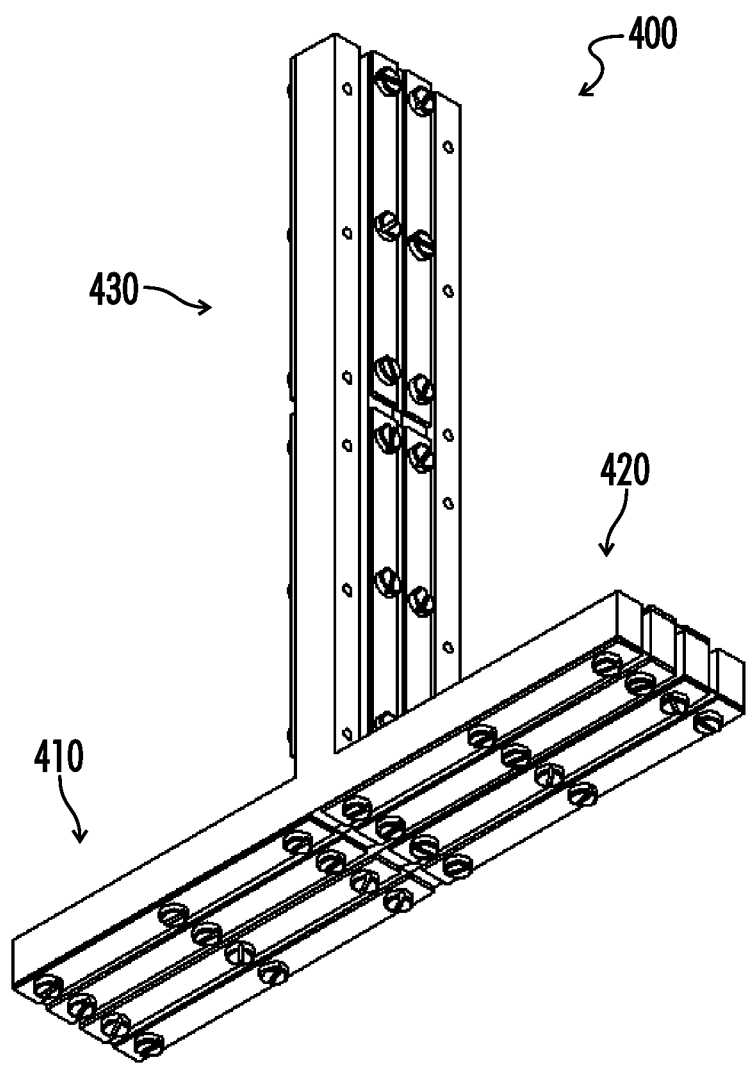
FIG. 9A shows an isometric view of an example of a T-shape design according to one embodiment of the invention.

In terms of deploying the PCM's in integrated assemblies, there are an infinite number of combinations. Two examples are illustrated in the embodiments 100a and 100b of FIGS. 6 and 7 respectively. FIG. 6 shows one embodiment of an example of two plates 110 and 130 being kept parallel with two PCM's 120 when a force F is applied to one of the centerline points 110*a* or 110*b* (if force is applied at 110*a*, than 110*b* will deflect by the same amount, and vice versa). FIG. 7 shows an example of one embodiment of two plates 110 and 130 being kept parallel with four PCM's 120 when a force F is applied to one of the corners represented by points 110*c*, 110*d*, 110*e* and 110*f*. FIG. 8 shows a specific embodiment of an assembly 300 in the form of a nanopositioning microscopy Z stage, essentially an example of two plates being kept parallel with four PCM's 340. The product example shown in FIG. 8 comprises a top case 310, piezo amplifier actuators 320, a printed control board (PCB) sub-assembly 330, an electric panel 350, a well plate 360, a well plate holder (moving world) 370, spacers 380 for PCB mounting and a sample well plate clamping system 390. Other single and multi-axis stages and assemblies are also possible. In a multi axis system it is envisaged that multiple PCM structures can be orthogonally stacked together to provide the necessary degrees of freedom for motion.

In an extension of the PCM concept, a composite multi-PCM arm structure can be envisaged. In this way, rather than the use of multiple separate linear PCM's 340 fixed between the fixed 310 and moving 370 plates of a positioning stage or assembly 300 as shown in FIGS. 6, 7 and 8, for example, a single composite PCM assembly 400 with multiple arms 410, 420 and 430 having an angular orientation between them is considered. This is illustrated in a specific example in FIGS. 9A through 9D showing a monolithic T-shaped structure PCM 400. Other composite multi arm PCM configurations are envisaged such as L- and H-shaped structures. Note that in all such composite configurations, each PCM arm retains the basic principle of operation and construction as a single linear PCM arm assembly. In the embodiment of FIGS. 9A-9D, there is also shown the gap 440 that is necessary for the middle flexure supports, in order for the combined multi-PCM arm mechanism to have the degrees of freedom necessary. This gap 400, for example, will be necessary in any composite multi-PCM configuration where there is an angular orientation of one PCM arm with respect to another.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A mechanical device for maintaining parallelism, comprising:
    a first bar, a second bar, a third bar and a fourth bar, each bar having an upper surface, a bottom surface, a first side surface and a second side surface, the upper surface of the first bar forming the upper surface of the device and the bottom surface of the fourth bar forming the bottom surface of the device; wherein
    the first side surface of the first bar and the first side surface of the second bar are bridged by a first flexure, leaving a gap between the bottom surface of the first bar and the upper surface of the second bar;
    the second side surface of the second bar and the second side surface of the third bar are bridged by a second flexure, leaving a gap between the bottom surface of the second bar and the upper surface of the third bar; and
    the first side surface of the third bar and the first side surface of the fourth bar are bridged by a third flexure, leaving a gap between the bottom surface of the third bar and the upper surface of the fourth bar.

2. The device of claim 1, further comprising a sensor for detecting a surface movement of the device.

3. The device of claim 2, wherein the sensor is a capacitive or strain gage sensor.

4. The device of claim 1, further comprising an actuator for adjusting a surface position of the device.

5. The device of claim 4, wherein the actuator is a piezoelectric actuator.

6. The device of claim 1, wherein the flexures and the bars are connected by a fastening means.

7. The device of claim 1, wherein the device is a monolithic structure.

8. The device of claim 1, wherein the first, second and third flexures extend an entire length of the respectively bridged first, second, third and fourth bars.

9. A mechanical device, comprising a first plate, a second plate, and a plurality of parallelism conservation devices;
    wherein each of the plurality of parallelism conservation devices comprises:
    a first bar, a second bar, a third bar and a fourth bar, each bar having an upper surface, a bottom surface, a first side surface and a second side surface, the upper surface of the first bar forming the upper surface of the device and the bottom surface of the fourth bar forming the bottom surface of the device; wherein
    the first side surface of the first bar and the first side surface of the second bar are bridged by a first flexure, leaving a gap between the bottom surface of the first bar and the upper surface of the second bar;
    the second side surface of the second bar and the second side surface of the third bar are bridged by a second flexure, leaving a gap between the bottom surface of the second bar and the upper surface of the third bar; and
    the first side surface of the third bar and the first side surface of the fourth bar are bridged by a third flexure, leaving a gap between the bottom surface of the third bar and the upper surface of the fourth bar;
    wherein the plates are kept parallel by the plurality of parallelism conservation devices situated between the plates.

10. The mechanical device of claim 9, further comprising an actuator for adjusting a distance between the first plate and the second plate.

11. The mechanical device of claim 10, further comprising a sensor for detecting a relative movement between the first plate and the second plate and providing feedbacks to the actuator.

12. The mechanical device of claim 11, wherein the sensor is a capacitive or strain gage sensor.

13. The mechanical device of claim 10, wherein the actuator is a piezoelectric actuator.

14. A mechanical device comprising a plurality of parallelism conservation devices that are joined at an angle;
    wherein each of the plurality of parallelism conservation device comprises:
    a first bar, a second bar, a third bar and a fourth bar, each bar having an upper surface, a bottom surface, a first side surface and a second side surface, the upper surface of the first bar forming the upper surface of the device and the bottom surface of the fourth bar forming the bottom surface of the device; wherein the first side surface of the first bar and the first side surface of the second bar are bridged by a first flexure, leaving a gap between the bottom surface of the first bar and the upper surface of the second bar;

the second side surface of the second bar and the second side surface of the third bar are bridged by a second flexure, leaving a gap between the bottom surface of the second bar and the upper surface of the third bar; and the first side surface of the third bar and the first side surface of the fourth bar are bridged by a third flexure, leaving a gap between the bottom surface of the third bar and the upper surface of the fourth bar.

15. The mechanical device of claim 14, wherein a gap exists in the flexure at a joint between the plurality of parallelism conservation devices to provide a degree of freedom.

* * * * *